Figure 1:
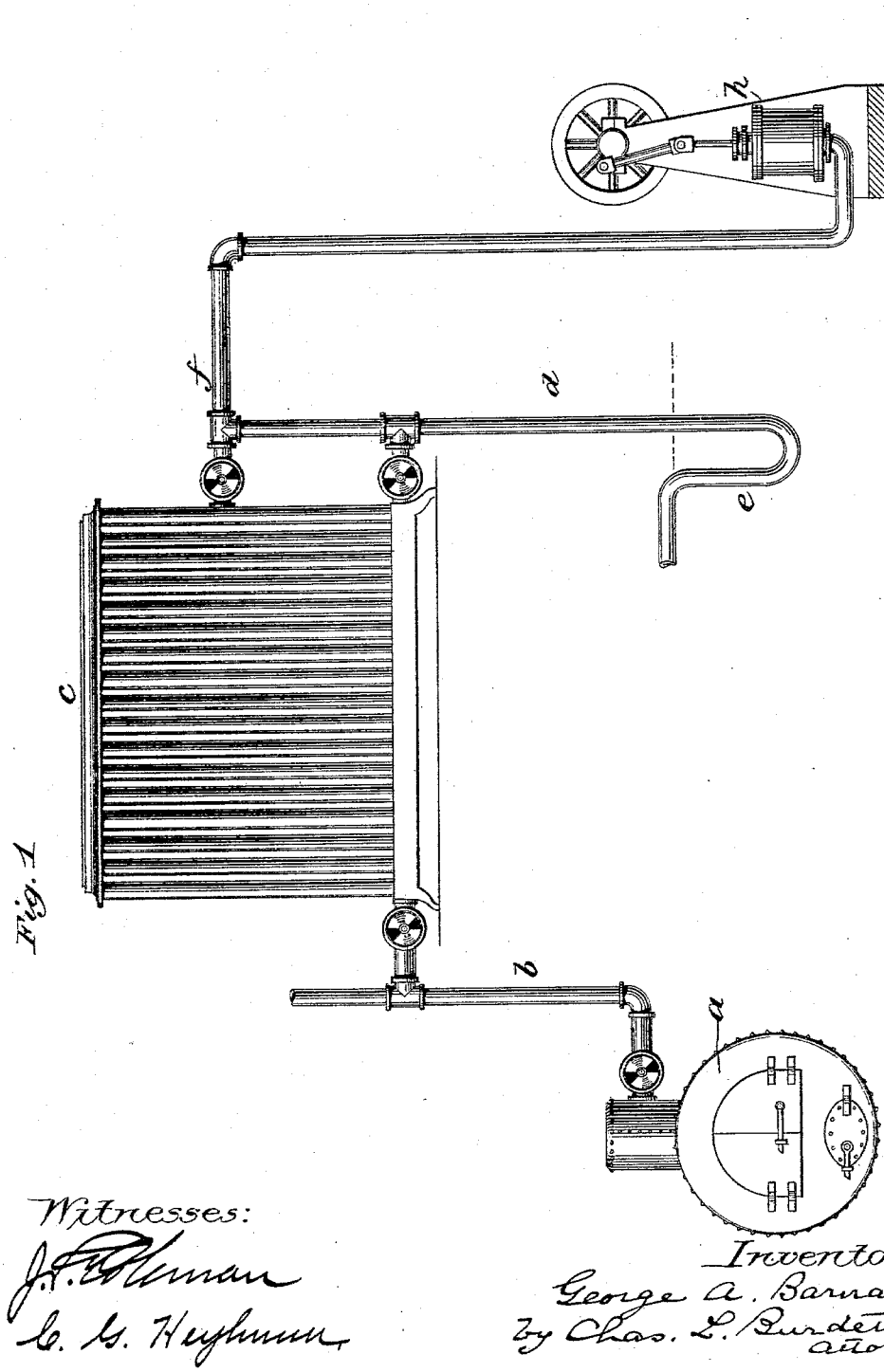

(No Model.) 4 Sheets—Sheet 1.
G. A. BARNARD.
STEAM HEATING APPARATUS.

No. 563,904. Patented July 14, 1896.

Witnesses:
J. F. Coleman
C. G. Heyhman

Inventor:
George A. Barnard,
by Chas. L. Burdett,
Attorney

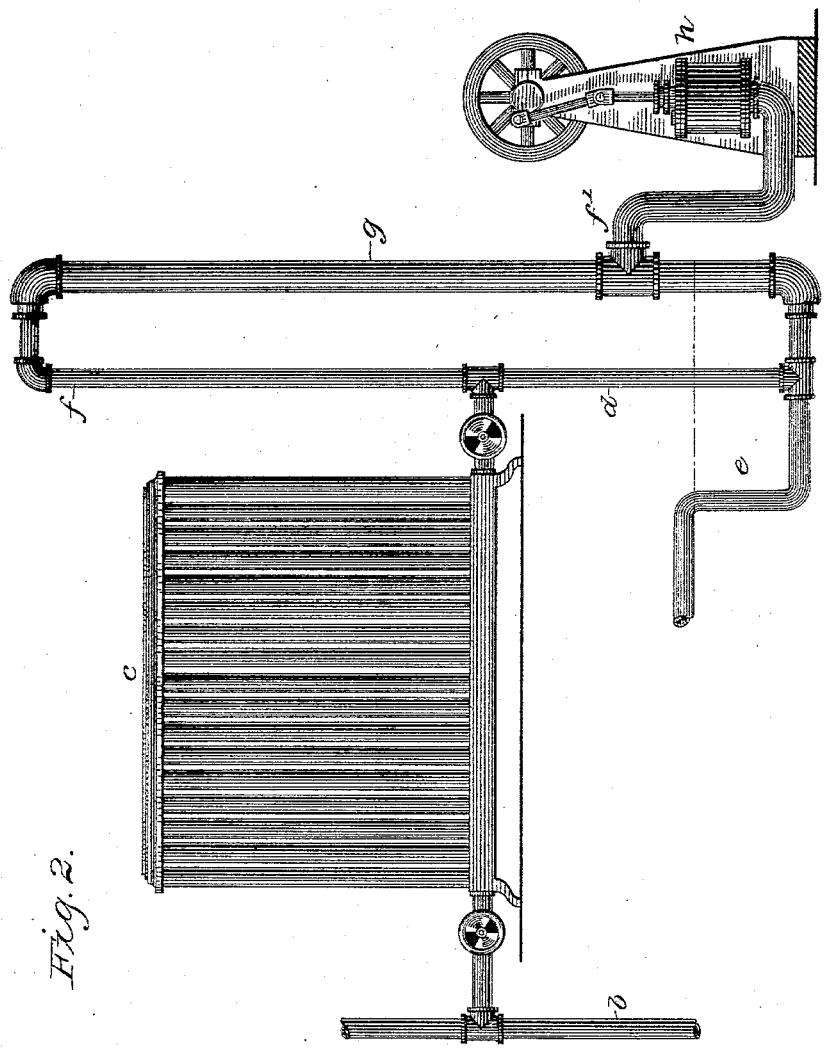

(No Model.)  4 Sheets—Sheet 3.
G. A. BARNARD.
STEAM HEATING APPARATUS.
No. 563,904. Patented July 14, 1896.
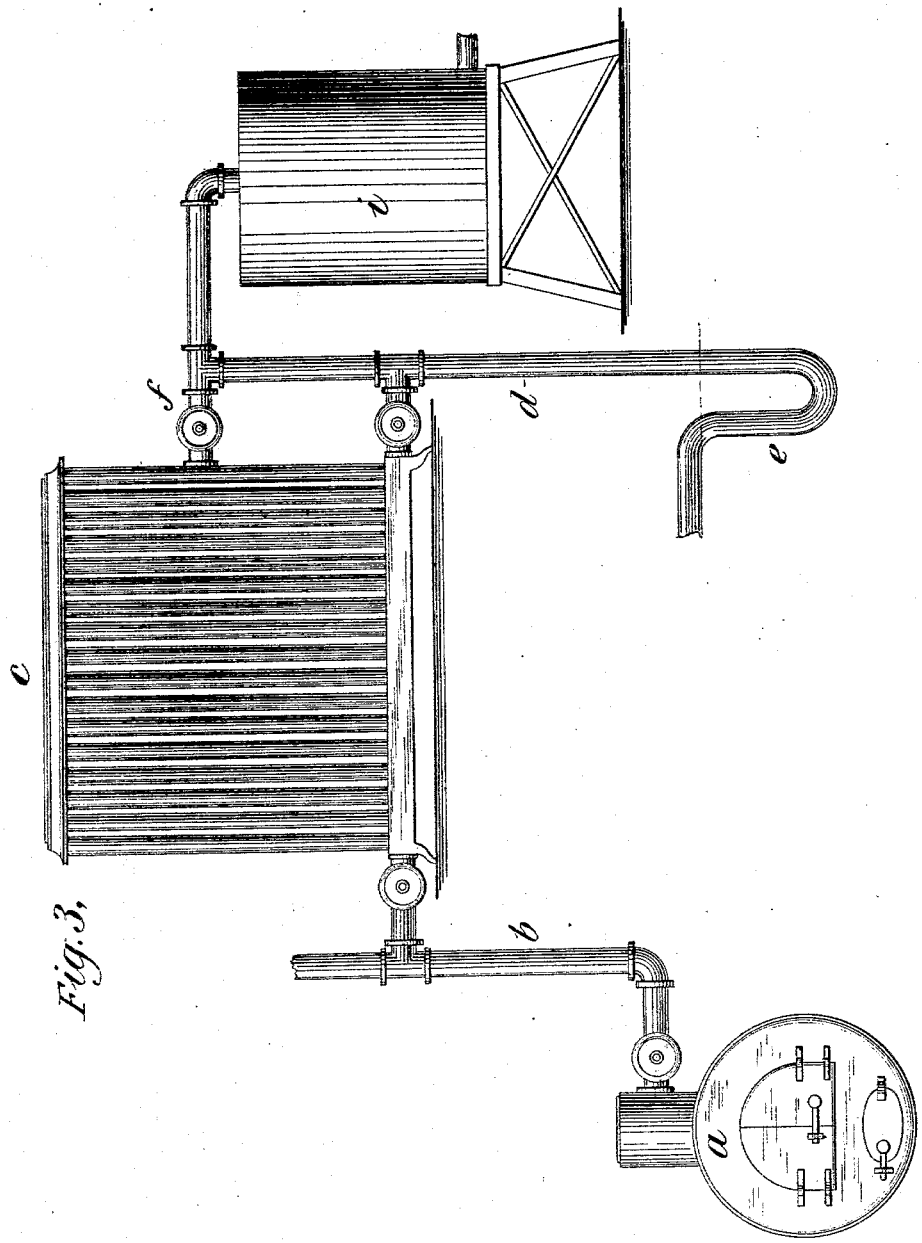
WITNESSES:
INVENTOR
George A. Barnard
BY
Witter & Kenyon ATTORNEYS (No Model.)
4 Sheets—Sheet 4.
G. A. BARNARD.
STEAM HEATING APPARATUS.
No. 563,904. Patented July 14, 1896.
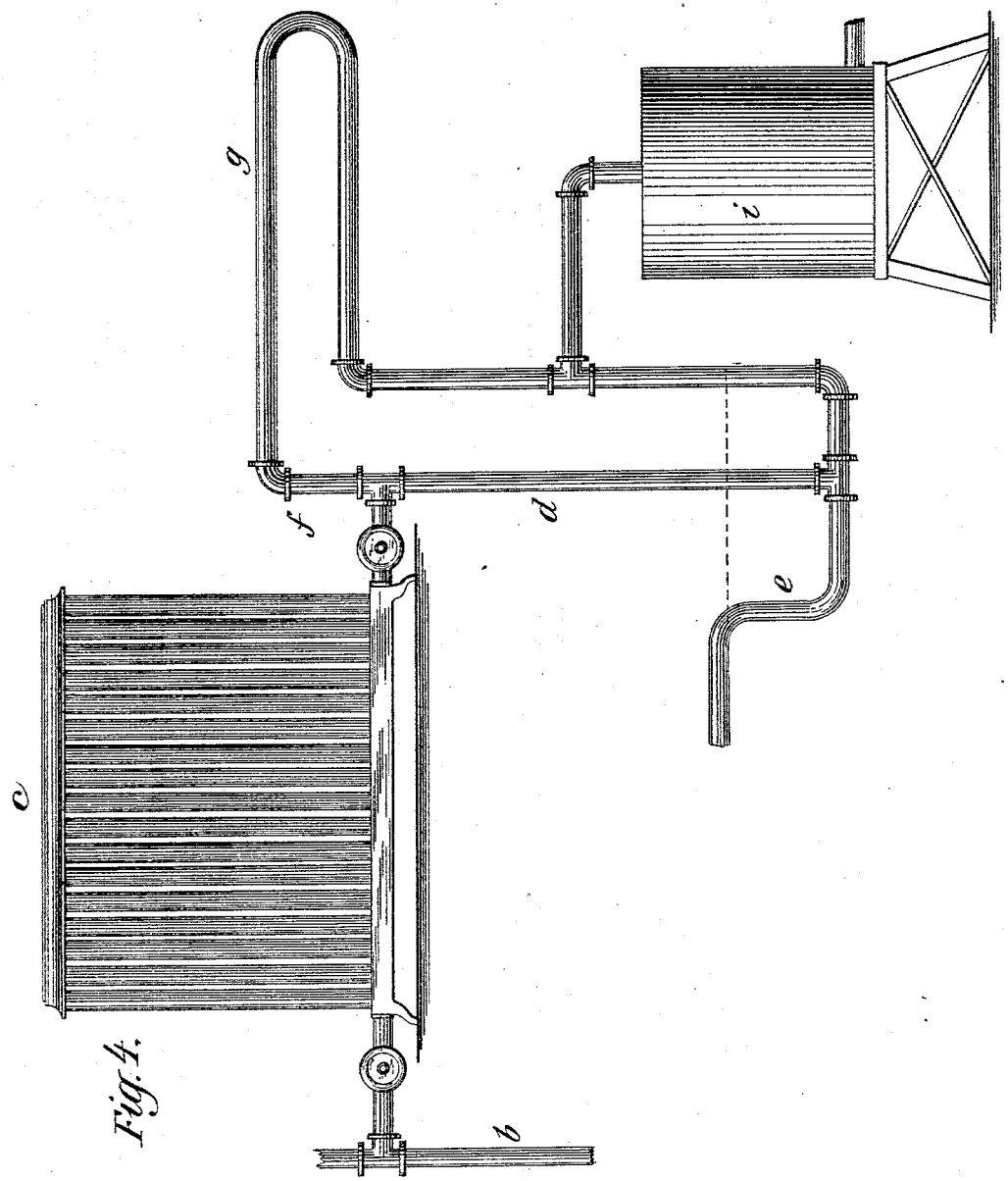
WITNESSES:
Andrew G. Paul
Frank A. Doeffler.
INVENTOR
George A. Barnard,
BY
Witter & Kenyon,
ATTORNEYS.

UNITED STATES PATENT OFFICE.

GEORGE A. BARNARD, OF NEW YORK, N. Y., ASSIGNOR TO THE PAUL STEAM SYSTEM COMPANY, OF MAINE.

STEAM HEATING APPARATUS.

SPECIFICATION forming part of Letters Patent No. 563,904, dated July 14, 1896.

Application filed April 8, 1890. Serial No. 347,131. (No model.)

*To all whom it may concern:*

Be it known that I, GEORGE A. BARNARD, of New York, in the county of New York and State of New York, have invented certain new and useful Improvements in Steam Heating Apparatus, of which the following is a full, clear, and exact description, whereby any one skilled in the art can make and use the same.

The object of my invention is to provide an apparatus by means of which a continuous or constant circulation of steam may be maintained throughout the pipes and radiators in a heating apparatus with a comparatively small initial pressure from the source of supply and without diverting the water of condensation flowing through the return-pipes of the system to the normal outlet thereof.

To this end my invention consists in the combination and arrangement of the several parts making up the apparatus as a whole, and in details of their construction, as more particularly hereinafter described, and pointed out in the claims.

Referring to the drawings, Figure 1 is a view in elevation illustrating one form of my apparatus. Fig. 2 is a view in elevation of an alternate form. Figs. 3 and 4 show other modifications of the invention.

In the operation of the several classes of steam heating apparatus the steam from any source of supply flows into the pipes of the system with a pressure depending upon that in the source of supply, and also upon the condition of the pipes of the system as to capacity or absence of specific obstructions, and in my within-described invention an apparatus is provided by means of which one or more of the obstacles to a free circulation of the steam is overcome in a simple and expeditious manner.

An essential feature of my invention is that in such apparatus air and a portion of the steam shall be caused to flow through a separate draft-pipe to a condenser or to a positive draft-producing device, so as to obviate the necessity of handling the return or condense water from the system in the draft-pipe or condenser, by means of which the obstacle to the circulation is overcome or the circulation of the steam aided, and so as to produce a continuous or constant circulation of steam from the supply-pipe through the radiator and draft-pipe, whereby the radiator is kept fully and constantly supplied with the heating agent and any air that may enter the radiator is carried out through the draft-pipe.

In the accompanying drawings the letter $a$ denotes a source of steam supply, in this instance a boiler, although steam from any source may be employed, whether from a boiler in the form of live steam or from an exhaust-pipe, or after the steam has been allowed, to a certain extent, to expand for any purpose.

$b$ denotes a steam-riser leading from the source of supply; $c$, a radiator, coil, or heating device; $d$, a return-pipe, and $e$ the trap or seal that forms the outlet for the return-water from the system.

There may be any convenient or desirable number of heating-coils used, and they may deliver into a common return consisting of a vertical pipe, or several returns may lead into a common receptacle, trap, or seal at the outlet. The form of seal shown in the drawings is a simple U-bend that operates in such way as to cause a certain normal water-flow, sealing the return-pipes against any inflow of air. This water-flow may be maintained at or near the bottom point or level of the system, or it may be maintained at a higher point in the return or returns.

One of the principal obstacles to the circulation of the steam is air that accumulates for various reasons in the pipes or coils of a steam-heating system, and another obstacle is the pressure in the return-pipes of steam used as a heating medium. In order to remove the air and to reduce the pressure of the steam at one or more points closely related to the return part of the system and thereby to cause a circulation of steam through the heater, a draft-pipe $f$ is connected to the heater or to the return at a point above the water-level in the heater or return or returns. In the constructions shown in Figs. 1 and 2 this draft-pipe leads from an air-pump that operates to draw upon the air and steam so as to create a flow of such air and steam from the return-pipe to the draft-producing device, or from a heater to such device when connection is made, as it may be, from the heater or coil. It is important that the draft-pipe shall be so connected to the return or to the heater or coil as to draw air or steam from the pipes or from the system without diverting return-water flowing through the return-pipes of the system to the normal outlet thereof.

In Fig. 2 a form of apparatus is shown in which a considerable length of pipe $f\ g$ extends beyond the outlet or return connection of a radiator $c$, the said pipe $g$ being of a sufficient size in cross-section to form what I term an "atmospheric condenser," that is, a vessel or length of pipe into which the steam may expand and be condensed by reason of the lower temperature of the medium surrounding the pipes $g$—that is, they may be arranged in a colder part of the building or for certain purposes on the outside thereof or in immediate contact with any refrigerating medium. The pipes of this atmospheric condenser usually deliver into or form part of the return-pipes of the system delivering into the common outlet that is sealed, as before described, in any ordinary manner. At some point in this pipe $g$, but necessarily above the water-level of the seal, the draft-pipe $f'$ is connected leading from the air-pump $h$.

In Figs. 3 and 4 are shown modifications of my invention in which a large condenser $i$ is connected with the end of the draft-pipe. These forms of apparatus are designed to be used with a somewhat higher initial pressure of steam in the supply-pipe. When sufficient pressure is employed, no pump is needed. When the system is started, the air can be blown out through the condenser. The condenser operates to condense the steam and to produce a current of steam through the heater and draft-pipe into the condenser, thus aiding the circulation. In the best form of the invention, however, a positive draft-producing device is also used, as already stated; but some of the advantages of my improvement may be secured by such arrangements as are shown in Figs. 3 and 4.

The apparatus is provided with a valve or valves, as shown, preferably near the heater, to control the flow of the steam into the draft-pipe.

The draft-producing device comprises what may be termed a "positive means" for removing air or like obstructions from the circulating-pipes of the heating system, as it operates directly on the fluid contents of such pipes and is operative to produce such results at any time desired and is not dependent on any preliminary flow of steam.

In my invention a current of steam is established and maintained not merely into the radiator, but through the radiator and into and through a separate draft-pipe. This flow of steam out of the radiator through the draft-pipe causes a fresh supply of steam to be constantly entering at the supply side. The supply of steam does not depend, therefore, merely upon the condensation in the radiator; but the condensation in the radiator is supplemented and aided by condensation in the condenser, to which the draft-pipe leads, and by the positive action of the draft-producing device. The flow of steam is not impeded or interfered with by the water of condensation from the system as that escapes through the return-pipe. There are two currents passing out of the radiator, one a current of steam or steam and air escaping through the draft-pipe and the other a current of water of condensation escaping through the return-pipe. The current of steam which is constantly passing out through the draft-pipe, being unchecked and unimpeded by any water of condensation, keeps up a steady and regular movement of the contents of the radiator in a direction away from the inlet or supply end toward the mouth of the draft-pipe. This movement of the contents of the radiator prevents air-binding and prevents any part of the radiator from becoming sluggish in its action.

My invention is especially applicable where there is an ample supply of steam, and where it is desirable to introduce the steam into the radiator more rapidly than it would enter merely from its own condensation.

I claim as my invention—

1. In a steam heating apparatus, the combination with a source of steam supply, a steam-riser, a coil or heater, a return-pipe delivering at a trapped or sealed end, a positive draft-producing means, and a steam draft-pipe in addition to the supply and return connected from said means to the coil or return pipe at a point above the normal water-level in the return, whereby a constant current of steam or steam and air is maintained through the radiator and through the draft-pipe without diverting the water of condensation, all substantially as described.

2. In a steam heating apparatus, in combination, a steam-supply pipe, a heater, a return-pipe therefrom, the seal at the delivery end or outlet of the return-pipe, the steam draft-pipe in addition to the supply and return connected to the return-pipe at a point above the normal water-level therein and to an atmospheric condenser, an atmospheric condenser, and an air-pump or like draft-producing means, whereby a constant current of steam or steam and air is maintained through the radiator and through the draft-pipe without diverting the water of condensation, all substantially as described.

3. In a steam heating apparatus, in combination, a steam-supply pipe, a heater, a return-pipe therefrom, the seal at the outlet end of the system, the steam draft-pipe in addition to the supply and return connected to the heater and to the return-pipe above the normal water-level therein and connected to a positively-operating draft-producing device, and an air-pump or like positive means for producing a draft, whereby a constant current of steam or steam and air is maintained through the radiator and through both branches of the draft-pipe without diverting the water of condensation, all substantially as described.

4. In a steam heating apparatus, the combination of a supply and return pipe or pipes, a coil or radiator, a steam draft-pipe in addition to the supply and return pipe or pipes connected with the radiator and a condenser connected with the draft-pipe, whereby a constant current of steam or steam and air is caused to flow through the radiator and draft-pipe to the condenser separate from the current of water of condensation flowing from the system, substantially as set forth.

5. In a steam heating apparatus, the combination of a supply and return pipe or pipes, a coil or heater, a steam draft-pipe in addition to the supply and return pipe or pipes connected with the heater, a condenser connected with the draft-pipe, and a positive draft-producing means with which the condenser is connected, whereby a constant current of steam or steam and air is caused to flow through the heater and draft-pipe to the condenser separate from the current of water of condensation flowing from the system and the air and water of condensation in the condenser and the surplus steam not condensed therein are removed therefrom by the positive draft-producing means, substantially as set forth.

6. In a steam heating apparatus, the combination of a supply and return pipe or pipes, a coil or radiator, a steam draft-pipe in addition to the supply and return pipe or pipes connected with the radiator, a condenser connected with the draft-pipe and means for controlling the flow of the steam into the draft-pipe, whereby a constant current of steam or steam and air is caused to flow through the radiator and draft-pipe to the condenser separate from the current of water of condensation flowing from the system and whereby this current can be regulated according to the needs of the system, substantially as set forth.

7. In a steam heating apparatus, the combination of a supply and return pipe or pipes, a coil or heater, a steam draft-pipe in addition to the supply and return pipe or pipes connected with the heater, a condenser connected with the draft-pipe and means for controlling the flow of the steam into the draft-pipe, and a positive draft-producing means with which the condenser is connected, substantially as set forth.

8. In a steam heating apparatus, the combination of a supply-pipe, a return-pipe delivering at a trapped or sealed end, a coil or radiator, a steam draft-pipe in addition to the supply and return pipes connected at one end with the radiator and at or near the other end with the sealed end of the return-pipe and a positive draft-producing means with which the draft-pipe is connected, substantially as set forth.

9. In a steam heating apparatus, the combination of a supply-pipe, a return-pipe delivering at a trapped or sealed end, a coil or radiator, a steam draft-pipe in addition to the supply and return pipes connected at one end with the radiator and at or near the other end with the sealed end of the return-pipe, a condenser connected with the draft-pipe and a positive draft-producing means with which condenser is connected, whereby a constant current of steam or steam and air is caused to flow through the radiator and draft-pipe to the condenser separate from the current of water of condensation flowing from the system and the air in the condenser and the surplus steam not condensed therein are removed therefrom by the positive draft-producing means, and the water of condensation formed in the condenser escapes through the sealed or trapped end of the return-pipe, substantially as set forth.

GEORGE A. BARNARD.

Witnesses:
CHAS. L. BURDETT,
ARTHUR B. JENKINS.